United States Patent Office 3,060,122
Patented Oct. 23, 1962

3,060,122
LUBRICATING OIL COMPOSITIONS CONTAINING POLY(ALKYLBENZENE-p-XYLYLENES) AS VISCOSITY INDEX IMPROVING AGENTS
Donovan R. Wilgus, Richmond, Calif., assignor, by mesne assignments, to the United States of America as represented by the United States Atomic Energy Commission
No Drawing. Filed Aug. 11, 1960, Ser. No. 48,838
4 Claims. (Cl. 252—59)

This invention relates to lubricating oil compositions containing new compositions of matter to improve the viscosity index characteristics thereof; in particular, this invention is directed to lubricating oil compositions containing new compositions of matter which are effective to improve the viscosity-temperature characteristics thereof.

This application is a continuation-in-part of patent application Serial No. 773,161, filed November 12, 1958, and now abandoned.

The greater proportion of oils obtainable by refining processes and useful as base oils for lubricating oil compositions have wide variations in viscosity characteristics with changes in temperature. They do not have agents specifically incorporated therein for the purpose of imparting reduced changes in viscosity with changes in temperature. That is, at a particular temperature, a lubricating oil may be quite viscous, while at higher temperatures the lubricating oil may have a viscosity of a fluid such as kerosene. In order that the viscosity of a lubricating oil composition will not change rapidly with changes in the temperature of an internal combustion engine, for example, numerous additives have been designed to modify the viscosity-temperature characteristics of lubricating oils. The changes in the viscosity occurring with variations in temperature are kept at a minimum.

Polymeric additives in general are used to improve the viscosity-index characteristics of lubricating oil compositions. Such polymeric additives include, for example, alkyl methacrylate polymers (e.g., polybutyl methacrylate), and polyolefins (e.g., polybutenes). These additives are known to improve the viscosity-temperature relationships of lubricating oils.

The viscosity-temperature relationship of a lubricating oil is referred to as the viscosity index. The higher the viscosity index, the less the change in viscosity with temperature. As used herein, the term viscosity index (V.I.) refers to the ASTM viscosity index.

The art is replete with numerous viscosity index improving agents. However, many of the known viscosity index improving agents (e.g., polyalkylmethacrylates) decompose at high temperatures. Thus, the V.I. improving effect of many presently used V.I. improving agents decreases rapidly at high temperatures.

Thus, it is a primary object of this invention to set forth lubricating oil compositions containing new compositions of matter which are thermally stable and which improve the viscosity-temperature characteristics thereof; that is, lubricating oil compositions containing new compositions of matter which increase the viscosity index thereof, including lubricating oil compositions used in an atmosphere of nuclear radiation.

In accordance with this invention, it has been discovered that the viscosity temperature characteristics of lubricating oil compositions are improved by incorporating therein alkylbenzene-p-xylylene copolymers (i.e., poly(alkylbenzene-p-xylylenes)).

The alkylbenzene-p-xylylene copolymers are described by the formula:

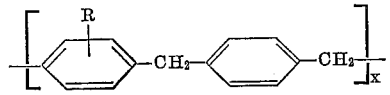

wherein R represents branched or straight-chain hydrocarbon radicals containing from 2 to 20 carbon atoms, and X is a number representing the number of monomeric units in the polymer.

It is preferred that R is an alkyl radical containing from 4 to 10 carbon atoms. Examples of R radicals include methyl, ethyl, propyl, butyl, hexyl, heptyl, octyl, nonyl, dodecyl, etc.

The molecular weights of the new compounds described herein range from 10,000 to 50,000 or higher.

The alkyl benzene-p-xylylene copolymers can be prepared by reacting an alkyl benzene with an $\alpha,\alpha'$-dichloro-p-xylene in the presence of a Friedel-Crafts catalyst as represented by the following equation:

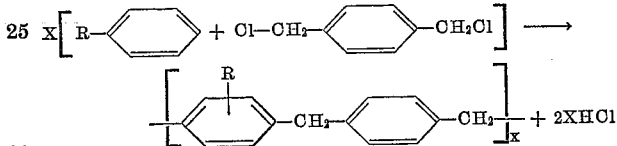

wherein R and X are the same as described hereinabove.

The polymeric materials described herein can be prepared by bulk or solution Friedel-Crafts polymerization reactions. The Friedel-Crafts catalysts which can be used include ferric chloride, aluminum chloride, aluminum bromide, etc. Such catalysts are used in amounts of about 0.01% to about 1.0%, by weight. The mol ratio of alkylbenzene to $\alpha,\alpha'$-dichloro-p-xylene can be in the range of 10:1 to 1:1, preferably from 1.2:1.

An alkylbenzene will react with $\alpha,\alpha'$-dichloro-p-xylene at temperatures ranging from 65° C. to 150° C. For best results in this reaction, it is preferred to use temperatures ranging from 90° C. to 120° C.

The various solvents which can be used in the polymerization reactions include chloroform, o-dichlorobenzene, nitrobenzene, etc.

As V.I. improving agents, the poly(alkylbenzene-p-xylylenes) described herein can be used in amounts of 1% to 20%, by weight, in a wide variety of lubricating oils, such as naphthenic base, paraffin base, and mixed base, other hydrocarbon lubricants, e.g., lubricating oils derived from coal products, and synthetic oils, e.g., alkylene polymers (such as polymers of propylene, butylene, etc., and mixtures thereof), alkylene oxide-type polymers, dicarboxylic acid esters (e.g., dibutyl adipate, di-2-ethylhexyl sebacate, etc.), liquid esters of acids of phosphorus, alkyl benzenes (e.g., dodecylbenzene), polymers of silicon (e.g., poly(methyl, phenyl)siloxane, tetraethyl silicate, etc.), polyphenyls (e.g., biphenyls and terphenyls), alkyl biphenyl ethers, etc. Synthetic oils of the alkylene oxide-type polymers which may be used include those exemplified by the alkylene oxide polymers (e.g., propylene-oxide polymers) and derivatives, including alkylene oxide polymers prepared by polymerizing the alkylene oxides, e.g., propylene oxide in the presence of water or alcohols, e.g., ethyl alcohol, esters of ethylene oxide-type polymers, e.g., acetylated ethylene oxide polymers prepared by acetylating ethylene oxide polymers containing hydroxyl groups; polyethers prepared from ethylene glycols, e.g., ethylene glycol, etc.

The above base oils may be used individually as such, or in various combinations, wherever miscible or wherever made so by the use of mutual solvents.

The new compositions of this invention can be prepared by reacting an alkylbenzene with $\alpha,\alpha'$-dichloro-p-xylene, using, as a catalyst, from 0.01% to 1.0%, by weight, of anhydrous aluminum chloride based on the total weight of alkylbenzene and $\alpha,\alpha'$-dichloroxylene, at temperatures from 65° C. to 150° C. for a period of time from 0.5 hour to 30 hours. In order to remove most residual active chlorine atoms, the reaction mixture may be refluxed for a peroid of time (e.g., 2–3 hours) in the presence of a catalyst (e.g., ferric chloride), after which the mixture is dissolved in benzene (or xylene), and filtered. An acetone-methanol blend (preferably 2 parts volume of methanol per volume of acetone) is added to the benzene solution to precipitate the polymer. The polymers are redissolved in benzene and reciprocated with an acetone-methanol blend. The resulting products can be dried in a vacuum oven at temperatures of about 100° C.

Example I hereinbelow illustrates the preparation of a new compound of this invention.

EXAMPLE I.—POLY(n-NONYLBENZENE-p-XYLYLENE)

17.5 grams (0.1 mol) of $\alpha,\alpha'$-p-dichloroxylene was dissolved in 24 grams (0.12 mol) of n-nonylbenzene. This mixture was dissolved in 50 cc. of chloroform. A trace of $Fe_2O_3$ was added, followed shortly thereafter by a trace of $FeCl_3$. This mixture was heated on a steam plate at temperatures of about 100° C. to 120° C. for less than 0.5 hour. The product thus formed was dissolved in 1 liter of benzene followed by the addition thereto of 0.2%, by weight, of ferric chloride. The mixture was filtered through Celite. An acetone-methanol blend was added to the benzene solution to precipitate the reaction product, which was recovered, redissolved in benzene, reprecipitated with an acetone-methanol blend, and dried in vacuo at 100° C.

EXAMPLE II.—PREPARATION OF POLY(n-BUTYL-BENZENE-p-XYLYLENE)

A mixture of 175 grams (1 mol) of $\alpha,\alpha'$-dichloro-p-xylene, 161 grams (1.2 mol) n-butylbenzene, 0.3 gram ferric oxide, and 0.01 gram of anhydrous ferric chloride was heated at about 100° C. for a time less than 0.5 hour. 400 cc. o-dichlorobenzene was added during the course of the reaction to keep mixture fluid. 200 cc. xylene was added, and the mixture was heated at about 126° C. for 2 hours, filtered, and the polymer precipitated by addition of blend of 2 parts by volume of methanol and 1 part by volume of acetone. The purified polymer contained 91.3% C, 8.5% H, and 0.2% Cl.

Table I hereinbelow sets forth the physical characteristics of the various polymeric compounds prepared according to this invention.

*Table I*

| Copolymers | Type of polymerization | Viscosity (cs.) at 100° F. (10%, by weight) in toluene | Percent polymer | Blends in $C_{14}$-$C_{16}$ Alkyl diphenyl ether viscosity (cs.) | | |
|---|---|---|---|---|---|---|
| | | | | 210° F. | 100° F. | V.I. |
| None | | | | 4.83 | 26.8 | 114 |
| n-Butylbenzene-p-xylylene | Bulk | 5.99 | 3 | 7.36 | 41.8 | 138 |
| | | | 5 | 9.61 | 55.6 | 142 |
| | | | 10 | 20.1 | 122 | 142 |
| | Solution | 4.01 | 3 | 6.82 | 39.8 | 133 |
| | | | 5 | 8.40 | 50.6 | 136 |
| | | | 10 | 15.8 | 106 | 137 |
| n-Nonylbenzene-p-xylylene | do | 1.67 | 5 | 7.04 | 41.4 | 133 |
| | | | 10 | 10.1 | 63.0 | 137 |
| | | | 15 | 14.3 | 94.3 | 137 |
| | | | ¹5 | 6.39 | 39.8 | 120 |
| | | | ¹10 | 8.58 | 55.1 | 130 |
| | | | ¹15 | 12.0 | 81.5 | 133 |

¹ In a solvent refined California base oil having a V.I. of 90.

As stated hereinabove, the new V.I. improving agents described herein are of greater thermal stability than prior V.I. improving agents. In order to determine the thermal stability thereof, the new compounds were incorporated in a base oil consisting of an alkyl diphenyl ether, wherein the alkyl group was derived from mono-olefins containing from 14–16 carbon atoms. The resulting solution was heated at 500° F. for a period of time noted, after which the viscosity of the oil was determined. Such data are presented in Table II hereinbelow.

*Table II*

| V.I. improving agent | Concentration (weight percent) | Test time (hours) | Viscosity (cs.) | | | | | |
|---|---|---|---|---|---|---|---|---|
| | | | Before test | | After test | | | |
| | | | 100° F. | 210° F. | 100° F. | Percent change | 210° F. | Percent change |
| 1. n-Butylbenzene-p-xylylene copolymer | 8 | 20 | 83.2 | 13.0 | 73.6 | −11.4 | 11.34 | −11.3 |
| 2. n-Butylbenzene-p-xylylene copolymer | 8 | 66 | 83.2 | 13.0 | 68.8 | −17.2 | 10.5 | −19.2 |
| 3. n-Butylbenzene-p-xylylene copolymer | 8 | 66 | 83.2 | 13.0 | 62.1 | −24.8 | 9.82 | −23.8 |
| 4. n-Nonylbenzene-p-xylylene copolymer | 13 | 20 | 83.3 | 12.6 | 78.5 | −5.8 | 11.8 | −6.5 |

I claim:

1. A lubricating oil composition comprising a major proportion of an oil of lubricating viscosity, and from 1% to 20%, by weight, of a poly(alkylbenzene-p-xylylene) of the formula:

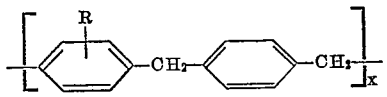

wherein R is an alkyl radical containing from 2 to 20 carbon atoms, and X is a number representing the number of monomeric units in the polymer such that the molecular weight of the resulting polymer is in the range of about 10,000 to about 50,000 wherein said poly(alkylbenezene-p-xylylene) was prepared by reacting an alkylbenzene with an $\alpha,\alpha'$-dichloro-p-xylene in the presence of a Friedel-Crafts catalyst.

2. A lubricating oil composition comprising a major proportion of an oil of lubricating viscosity, and from 1% to 20% by weight, of a poly(alkylbenzene-p-xylylene) of the formula:

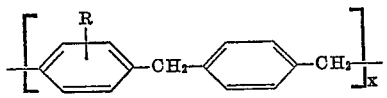

wherein R is an alkyl radical containing from 4 to 10 carbon atoms, and X is a number representing the number of monomeric units present in the polymer having a molecular weight in the range of about 10,000 to about 50,000 wherein said poly(alkylbenzene-p-xylylene) was prepared by reacting an alkylbenzene with an $\alpha,\alpha'$-dichloro-p-xylene in the presence of a Friedel-Crafts catalyst.

3. A lubricating oil composition comprising a major proportion of an oil of lubricating viscosity and in an amount sufficient to improve the viscosity index thereof, a poly(alkylbenzene-p-xylylene) of the formula:

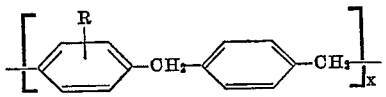

wherein R is an alkyl radical containing from 2 to 20 carbon atoms, and X is a number representing the number of monomeric units present in the polymer having a molecular weight in the range of about 10,000 to about 50,000, wherein said poly(alkylbenzene-p-xylylene) was prepared by reacting an alkylbenzene with an $\alpha,\alpha'$-dichloro-p-xylene in the presence of a Friedel-Crafts catalyst.

4. A lubricating oil composition comprising a major proportion of an oil of lubricating viscosity and in an amount sufficient to improve the viscosity index thereof, a poly(alkylbenzene-p-xylylene) of the formula:

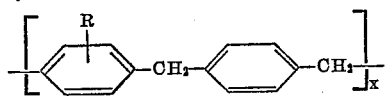

wherein R is an alkyl radical containing from 4 to 10 carbon atoms, and X is a number representing the number of monomeric units present in the polymer having a molecular weight in the range of about 10,000 to about 50,000, wherein said poly(alkylbenzene-p-xylylene) was prepared by reacting an alkylbenzene with an $\alpha,\alpha'$-dichloro-p-xylene in the presence of a Friedel-Crafts catalyst, wherein said base oil is an alkyl diphenyl-ether.

References Cited in the file of this patent

UNITED STATES PATENTS

| | | |
|---|---|---|
| 2,292,164 | Sibley | Aug. 4, 1942 |
| 2,712,532 | Szwarc et al. | July 5, 1955 |
| 2,870,098 | Martin et al. | Jan. 20, 1959 |